United States Patent
Lee et al.

(10) Patent No.: US 7,906,243 B2
(45) Date of Patent: Mar. 15, 2011

(54) ACCELERATED TESTING METHOD OF RAPIDLY EVALUATING LIFESPAN OF FUEL CELL

(75) Inventors: Seung-jae Lee, Seongnam-si (KR); Hyuk Chang, Seongnam-si (KR); Ji-rae Kim, Seoul (KR); Gongquan Sun, Dalian (CN); Xinsheng Zhao, Dalian (CN); Qin Xin, Dalian (CN)

(73) Assignee: Samsung SDI Co., Ltd., Yongin-si (KR)

( * ) Notice: Subject to any disclaimer, the term of this patent is extended or adjusted under 35 U.S.C. 154(b) by 1355 days.

(21) Appl. No.: 11/336,873

(22) Filed: Jan. 23, 2006

(65) Prior Publication Data
US 2006/0166052 A1 Jul. 27, 2006

(30) Foreign Application Priority Data
Jan. 21, 2005 (KR) ................ 10-2005-0005817

(51) Int. Cl.
*H01M 8/00* (2006.01)
(52) U.S. Cl. .................... 429/432; 429/431
(58) Field of Classification Search ............ 429/13, 429/430, 431, 432
See application file for complete search history.

(56) References Cited

U.S. PATENT DOCUMENTS

| | | | |
|---|---|---|---|
| 4,716,087 A * | 12/1987 | Ito et al. .............. | 429/40 |
| 2003/0198852 A1* | 10/2003 | Masel et al. .......... | 429/30 |
| 2004/0095127 A1 | 5/2004 | Mohri et al. | |

FOREIGN PATENT DOCUMENTS

| | | |
|---|---|---|
| GB | 2 015 171 | 9/1979 |
| JP | 08-048502 | 2/1996 |
| JP | 09-180737 | 7/1997 |
| JP | 9-274929 | 10/1997 |
| JP | 2000-048845 | 2/2000 |
| JP | 2000-206214 | 7/2000 |
| JP | 2004-039490 | 2/2004 |
| JP | 2004039490 A * | 2/2004 |
| JP | 2004-172105 | 6/2004 |
| JP | 2004-220786 | 8/2004 |

(Continued)

OTHER PUBLICATIONS

Thomas et al., "Direct methanol fuel cells: progress in cell performance and cathode research", J. of Electrochim. Acta, 47 (2002), pp. 3741-3748.

(Continued)

*Primary Examiner* — Dah-Wei D Yuan
*Assistant Examiner* — Stephan Essex
(74) *Attorney, Agent, or Firm* — Christie, Parker & Hale, LLP

(57) ABSTRACT

A method of estimating a lifespan of a fuel cell including a cathode and an anode which contain catalysts and an electrolyte membrane interposed between the anode and the cathode. A cyclic potential with a voltage ranging from a low voltage to a voltage greater than oxidation voltages of the catalysts is applied between the anode and the cathode and fuel cell performance is measured initially and after a predetermined number of cycles. The lifespan of the fuel cell may estimated based on degradation of cell performance after the predetermined number of cycles, based on CV curves obtained during the cycling of the potential and/or a change in particle size of the catalysts after the predetermined number of cycles.

9 Claims, 5 Drawing Sheets

FOREIGN PATENT DOCUMENTS

JP 2004-327205 11/2004

OTHER PUBLICATIONS

Cheng et al., "Catalyst Microstructure Examination of PEMFC Membrane Electrode Assemblies vs. Time", J. of Electrochem. Soc., 151 (2004), pp. A48-A52.

Office Action issued in Korean Patent Application No. 2005-5817 on Apr. 17, 2006.

Japanese Office Action issued Dec. 22, 2009 in a corresponding Japanese patent application.

Certificate of Patent No. ZL200610005898 issued in the corresponding Chinese application by the Chinese Intellectual Property Office on Jan. 6, 2010 (including the Chinese application CN 100578249C).

* cited by examiner

ACCELERATED TESTING METHOD OF RAPIDLY EVALUATING LIFESPAN OF FUEL CELL

CROSS-REFERENCE TO RELATED APPLICATIONS

This application claims the benefit of Korean Patent Application No. 10-2005-5817, filed on Jan. 21, 2005, in the Korean Intellectual Property Office, the disclosure of which is incorporated herein by reference.

BACKGROUND OF THE INVENTION

1. Field of the Invention

Aspects of the present invention relate to an accelerated testing method of evaluating the lifespan of a fuel cell, and more particularly, to a rapid testing method of evaluating the lifespan of a fuel cell including a catalyst, a membrane and a MEA (Membrane & Electrode Assembly).

2. Description of the Related Art

A first method of determining long-term stability of an anode and methanol crossover for 2,000 hours of operation is described as a method for evaluating the lifespan of a fuel cell in J. of Electrochim. Acta, 47, 3741 (2002). According to the first method, a direct methanol fuel cell (DMFC) single cell is operated using 1M methanol/air at 0.4 V and 100° C. to measure power density and fuel utilization with respect to operating time.

A second method of evaluating the lifespan of a fuel cell, a method of measuring the lifespan of a polymer electrolyte membrane fuel cell (PEMFC) single cell for 4,000 hours of operation to investigate the catalyst microstructure in the fuel cell is described in J. of Electrochem. Soc., 151, A48 (2004). According to the second method, the PEMFC single cell is operated using $H_2$/air at a current density of about 400 mA/cm$^2$, 60° C. and a relative humidity of about 100% for about 4,000 hours to evaluate the performance of the single cell with respect to operation time.

According to the first and second methods described above, a long time is required to evaluate the lifespan of a fuel cell, which increases evaluation costs. Thus, there is a need for an accelerated testing method to rapidly evaluate the lifespan of a fuel cell.

SUMMARY OF THE INVENTION

Aspects of the present invention provide an accelerated testing method of rapidly evaluating the lifespan of a fuel cell.

According to an aspect of the present invention, an accelerated testing method of evaluating the lifespan of a fuel cell including a cathode and an anode which contain catalysts and an electrolyte membrane interposed between the anode and cathode includes: measuring a cyclic voltammetry (CV) curve of the fuel cell using CV with a scan voltage ranging from a low voltage, generally 50 mV vs. DHE, (dynamic hydrogen electrode) to a high voltage of V1 greater than the oxidation voltages of the catalysts; and determining the lifespan of the fuel cell using current densities for various CV curve cycles and a catalytic active area obtained from a hydrogen adsorption/desorption area in the CV curve.

When measuring the CV curve, a working electrode may be an anode, and a reference electrode and counter electrode may be a cathode, or a working electrode may be a cathode, and a reference electrode and counter electrode may be an anode.

According to another aspect of the present invention, an accelerated testing method of evaluating the lifespan of a fuel cell including a cathode and an anode which contain catalysts and an electrolyte membrane interposed between the anode and the cathode includes: measuring a variation in cell performance with respect to number of cycles by investigating a variation in a cell potential with respect to a current density of the fuel cell; and determining the lifespan of the fuel cell from a degree of the variation in the cell performance measured.

According to another aspect of the present invention, an accelerated testing method of evaluating the lifespan of a fuel cell including a cathode and an anode which contain catalysts and an electrolyte membrane interposed between the anode and the cathode includes: performing potential cycling with a scan voltage ranging from a low voltage (generally 50 mV vs. DHE) to a high voltage of V2 greater than the oxidation voltages of the catalysts; and determining the degree of catalyst aging by observing catalyst particles and morphologic variation of the resultant using a transmission electron microscope (TEM).

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
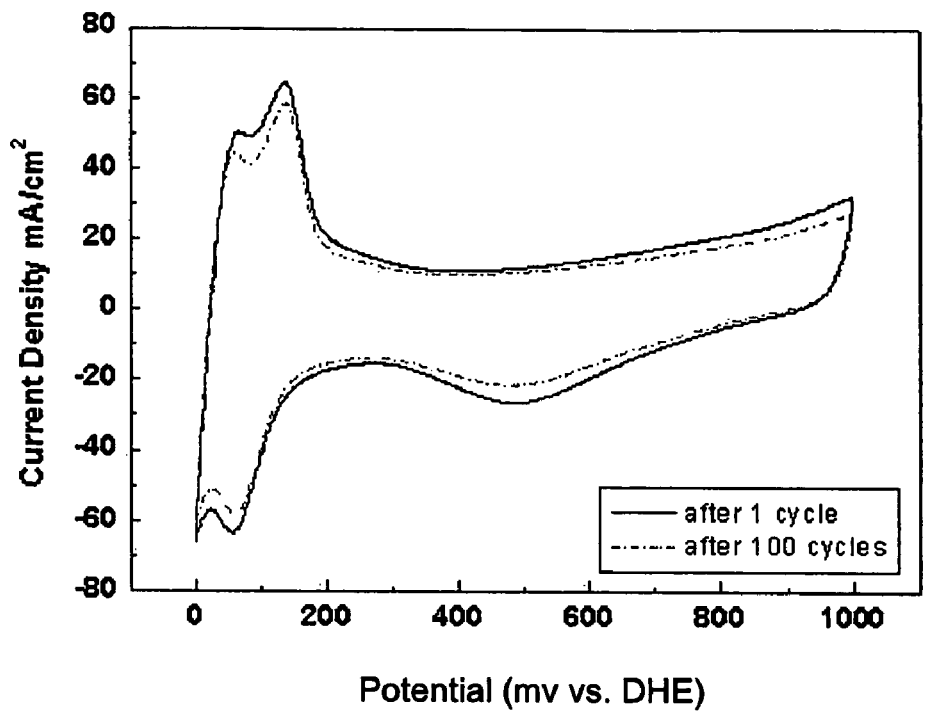
FIGS. 1A-1C are CV curves of a fuel cell according to Example 1 of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An accelerated testing method to evaluate the lifespan of a fuel cell according to an embodiment of the present invention includes at least one of the following three processes:

1. a cyclic voltammetry measurement
2. a single cell performance measurement
3. a catalyst particle size and morphology observation (TEM measurement).

The first and second measurements are for quantitatively evaluating the lifespan of a fuel cell and the third measurement is for qualitatively evaluating the lifespan of a fuel cell.

The three processes will now be described in more detail.

The cyclic voltammetry (CV) measurement includes: measuring a CV curve of the fuel cell using a scan voltage no greater than a voltage of V1 greater than the oxidation voltages of catalysts, in particular, a scan voltage ranging from 0.3 V to V1; and determining the lifespan of the fuel cell from a current density after various numbers of cycles of measuring the CV curve and a catalytic active area calculated from the total area enclosed by the CV curve. When the range of the scan voltage does not extend above the oxidation voltages of catalysts, catalyst aging slowly occurs. When the range of the scan voltage extends below 0.3 V, a catalyst aging process is not accelerated. The oxidation voltage of the catalyst indicates a voltage changing a catalyst metal to a catalyst ion.

When performing the CV measurement, a cathode is used as a counter electrode/reference electrode and an anode is used as a working electrode. The potential applied to the cathode is adjusted above 0V (vs. DHE), and the high voltage of V1 and V2 is adjusted to be a voltage greater than the oxidation voltages of the catalysts.

Support free or support containing catalysts of various compositions are useable in the present invention and examples thereof include PtRu/C, PtRu black, Pt/C, Pt black, PtSn, PtPd, PtNi, PtMo, PtOs, PtCo and mixtures thereof. A content of metallic catalyst particles in the catalyst is 10 to 80 wt % based on the total weight of the catalyst.

V1 is variable according to a type of catalyst, and may be in a range of 0 to 1.5 V (vs. DHE). The scan rate may be in a range of 20 to 50 mV/s.

When the lifespan of a fuel cell is evaluated using the CV, the lifespan is defined as a number of CV cycles taken to reduce the current density to 20-70% of the current density measured after 1 cycle or as the number of cycles taken to reduce the catalytic active area to 20-70% of the catalytic active area measured after 1 cycle.

The single cell performance measurement includes: measuring a variation in cell performance with respect to a number of cycles by investigating a variation in a cell potential with respect to a current density of the fuel cell; and determining the lifespan of the fuel cell from a degree of variation in the cell performance measured.

When measuring the single cell performance, the lifespan of the fuel cell is defined as the number of cycles taken to reduce the cell potential to about 20% of the cell potential measured after 1 cycle at a current density of about 200 mA/cm$^2$.

The catalyst particle size and morphology observation includes: performing potential cycling in a voltage range not extending higher than a voltage of V2 greater than the oxidation voltages of catalysts of the fuel cell, in particular, in a voltage range between 0.3 V and V2; and observing catalyst particles and morphologic variations in the resultant using a transmission electron microscope (TEM) to qualitatively determine a degree of catalyst aging.

When the voltage range does not extend above the oxidation voltages of catalysts, the catalyst aging slowly occurs. When the voltage range extends below 0.3 V, the catalyst aging process is not accelerated. The V2 may be in a range from 0.3 to 1.5 V.

The accelerated testing methods to evaluate the lifespan of a fuel cell as described above are useable to more rapidly evaluate the lifespan of a fuel cell than a conventional testing method. Thus, the methods according to aspects of the present invention can significantly reduce testing costs and time compared to a conventional testing method.

Aspects of the present invention will now be described in greater detail with reference to the following examples. The following examples are for illustrative purposes only and are not intended to limit the scope of the invention.

EXAMPLE 1

A first catalyst suspension was obtained by dissolving 45 wt % PtRu/C (Johnson Matthey Corp.) and a Nafion solution (DU PONT) in ethanol. The first catalyst suspension was sprayed on a cleaned polytetrafluoroethylene (PTFE) film to obtain an anode catalyst layer. The concentration of the catalyst in the anode catalyst layer was 2.0 mg/cm$^2$.

A second catalyst suspension was obtained by dissolving 20 wt % Pt/C (Johnson Matthey Corp.) and a Nafion solution (Du Pont) in ethanol. The second catalyst suspension was sprayed on a cleaned PTFE film to obtain a cathode catalyst layer. The concentration of the catalyst in the cathode catalyst layer was 1.0 mg/cm$^2$.

The cathode catalyst layer and the anode catalyst layer were used to prepare a cathode and an anode, respectively, and a Nafion 115 film was interposed between the cathode and the anode to manufacture membrane and electrode assembly (MEA). The active area of the MEA was about 4 cm$^2$.

A fuel cell including the MEA was operated at 75° C. with 1.0 M methanol solution and oxygen (2 atm) and the current-voltage curve of the MEA was measured using an Arbin fuel cell test system (USA).

In order to electrochemically accelerate catalyst aging, the cyclic voltammetry (CV) was adopted. The anode as the working electrode was purged with humidified nitrogen and the cathode as a reference electrode and a counter electrode was fed with humidified hydrogen. The cell temperature was maintained at about 75°, the scan rate was 20 mV/s, and the potential ranged from 0 to 1.0 V (vs. DHE).

Figure 1B:
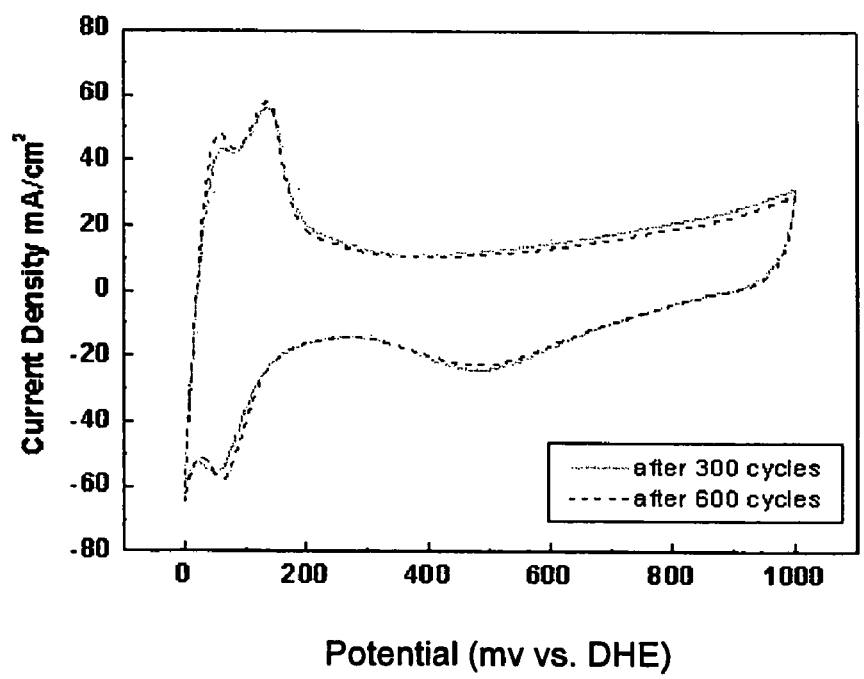

FIGS. 1A, 1B and 1$d$ illustrate the CV curves obtained according to the above procedures and show CV curves after performing various numbers of cycles (1 to 1200 cycles) at the anode. As shown in FIGS. 1A-1C, the catalytic active area decreased as the number of cycles increased.

In addition, the variation in current potential with respect to current density in the fuel cell of Example 1 was investigated to evaluate cell performance. The results are illustrated in FIG. 2. As shown in FIG. 2, the cell performance decreased as the number of cycles increased. Referring to FIGS. 1 and 2, after 1200 cycles the current density was reduced by about 25% and the active area was reduced by about 40% relative to the active area after 1 cycle.

The above results show that potential cycling is an effective method for accelerating electro-catalyst aging at a voltage greater than the oxidation voltages of catalysts.

EXAMPLE 2

The electrochemical characteristics of PtRu/C were evaluated in a three-electrode system using a potentiostat/galvanostat (EG&G 273A) apparatus. A 5.0 mg quantity of 45 wt. % PtRu/C was suspended in 1 ml of ethanol, and 10.0 wt. % Nafion was added as an adhesive and a proton conductor. The mixture was ultrasonically scattered for 10 minutes to form a homogeneous mixture. Then, the ultrasonically scattered mixture was pipeted onto a carbon-glass (GC) electrode with a diameter of 4 mm to act as a working electrode. A saturated calomel electrode (SCE) and a platinum filament were used as a reference electrode (RE) and a counter electrode (CE), respectively. The voltage was adjusted to be in the range from −0.24 to 1.2 V (vs. SCE) and the scan rate was 20 mV/s. All experiments were carried out at room temperature.

Figure 3:
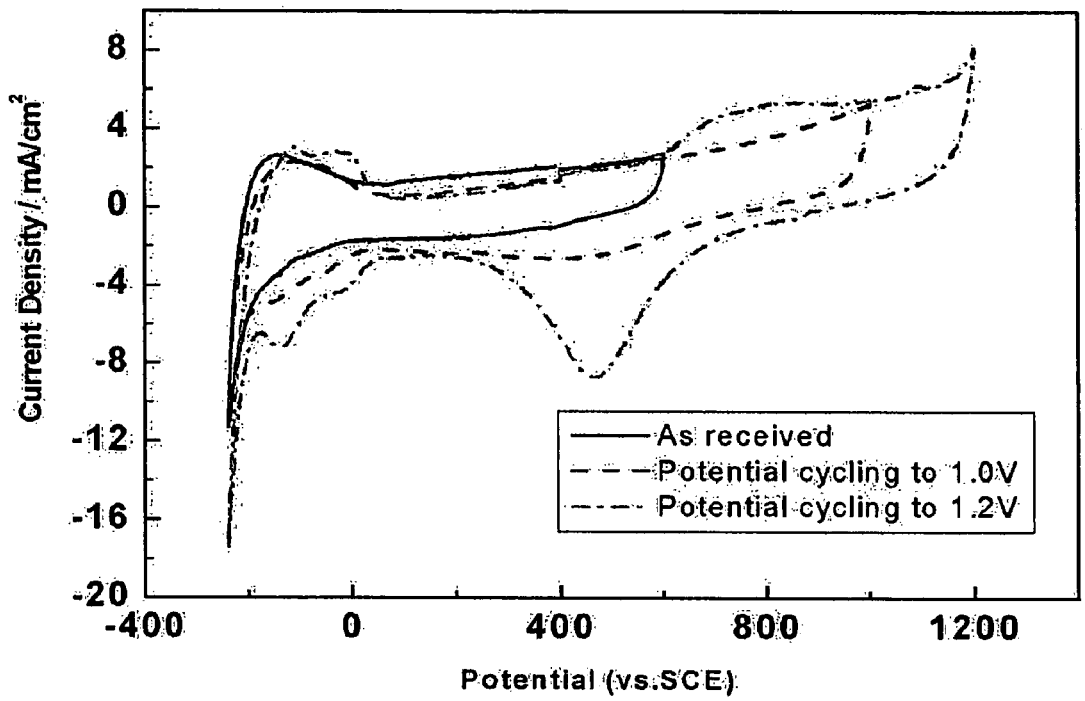
FIGS. 3 and 4 are CV curves of a fuel cell according to Example 2 of the present invention.

When the upper limit potential was set to 0.55 V (vs. SCE), the typical PtRu/C peak was initially observed. When the anodic upper potential was set to 1.0V, the characteristics of "Ru_" catalysts of the CV curves gradually disappeared, i.e., the current in the double-layer region decreased, and the cathode peak of Pt oxide reduction sharpened and shifted toward a positive potential. When an anodic high potential of 1.2V was applied on the PtRu/C catalyst, the CV curves exhibited the standard characteristics of CV curves of Pt/C catalysts. A steady-state voltammogram cycle reached after the extended potential cycling is shown in FIG. 3 by a dashed line.

EXAMPLE 3

Figure 4:
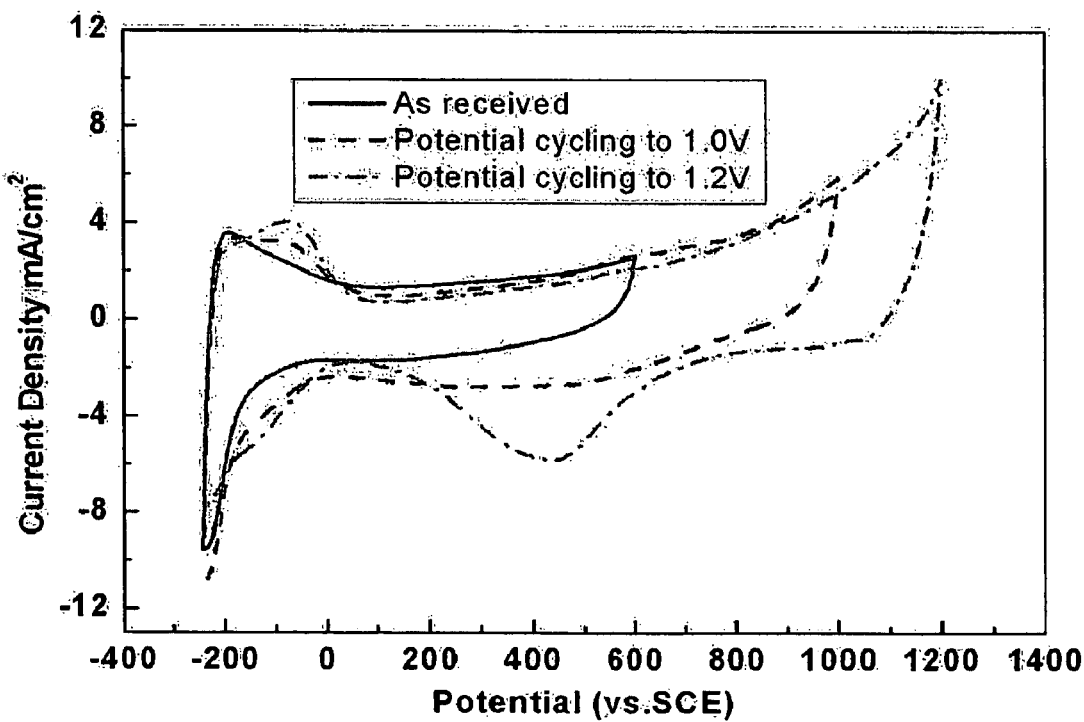

An experiment was performed in the same manner as in the Example 2, except that 30 wt % PtRu/C was used instead of 45 wt % PtRu/C. FIG. 4 shows the results. The results shown in FIG. 4 are similar to the results shown in FIG. 3. When the upper limit potential was set to 0.55 V (vs. SCE), the typical PtRu/C peak was observed. When the anodic upper potential was set to 1.0 V, the characteristics of Ru catalysts of the CV curves gradually disappeared, i.e., the current in the double-layer region decreased, and the cathode peak of Pt oxide reduction sharpened and shifted toward a positive potential. When an anodic high potential of 1.2V was applied on the PtRu/C catalyst, the CV curves exhibited the standard characteristics of CV curves of Pt/C catalysts.

EXAMPLE 4

Figure 5:
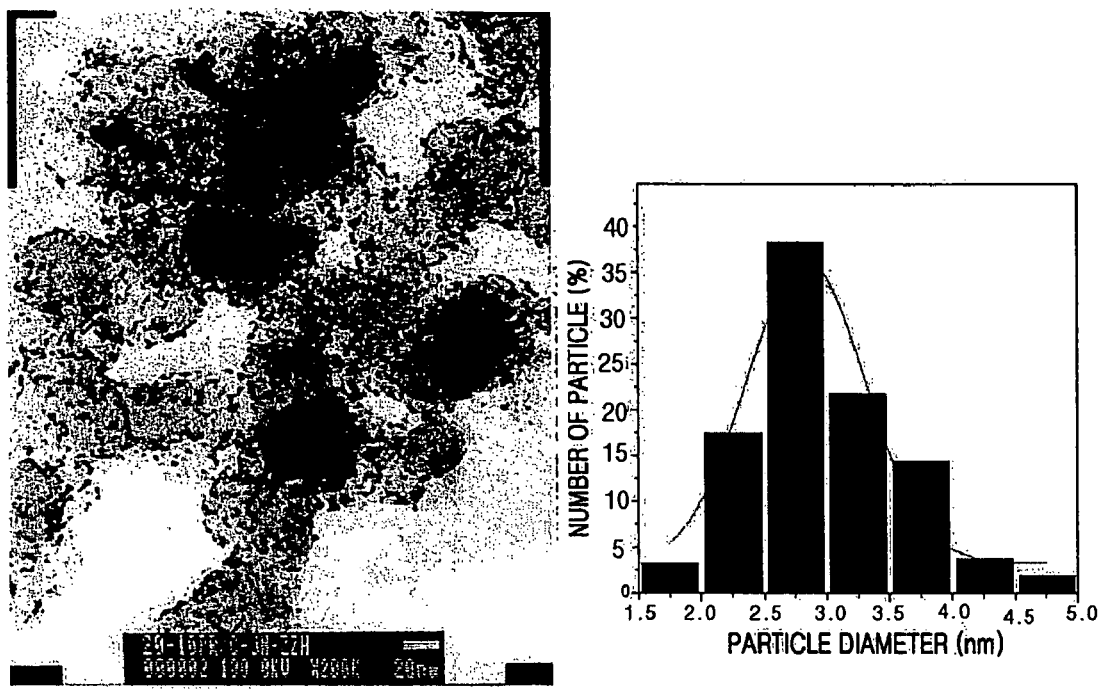
FIG. 5 is a TEM photograph of 30 wt % PtRu/C before potential cycling in Example 3 of the present invention.
Figure 6:
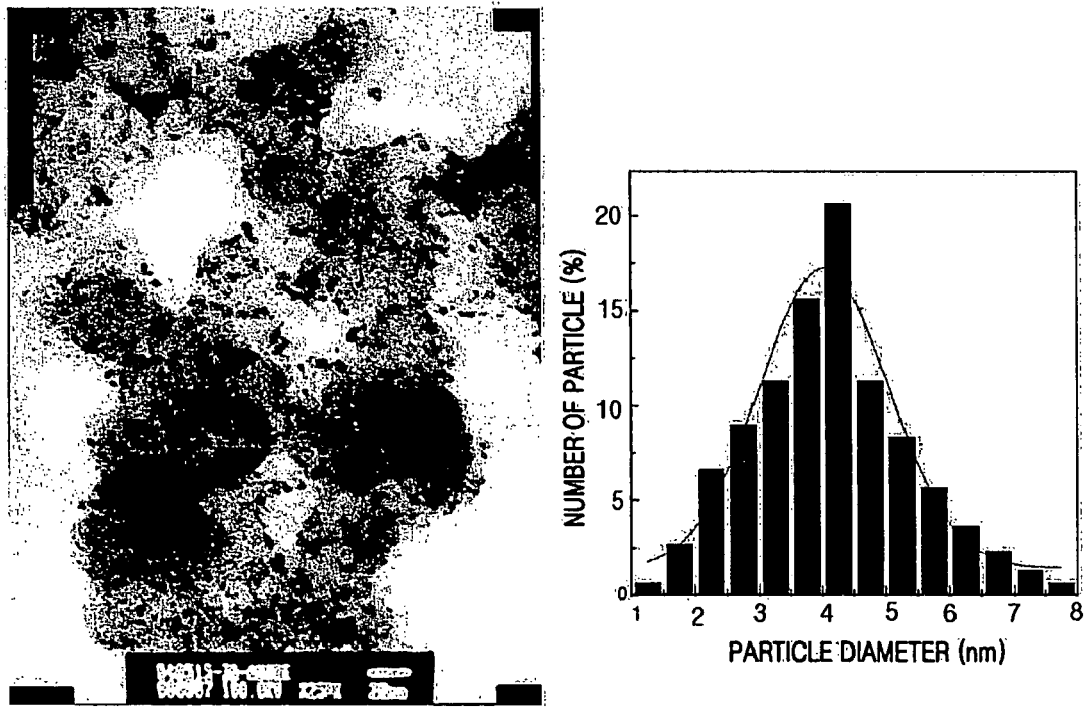
FIG. 6 is a TEM photograph of 30 wt % PtRu/C after potential cycling to 1.2 V in Example 3 of the present invention.

Using a fuel cell representative of Example 3, TEM images of 30 wt % PtRu/C after potential cycling to 1.2 V were investigated. The results are illustrated in FIGS. 5 and 6. The results shown in FIG. 5 were obtained before potential cycling to 1.2 V and the results shown in FIG. 6 were obtained after potential cycling.

Referring to FIGS. 5 and 6, it is evident that the particle distribution and composition changed significantly after potential cycling. A significant portion of the metal particles of PtRu/C agglomerated. The CV and TEM results reflect that the active phase composition of the PtRu/C was altered after potential cycling at a high potential.

Figure 7:
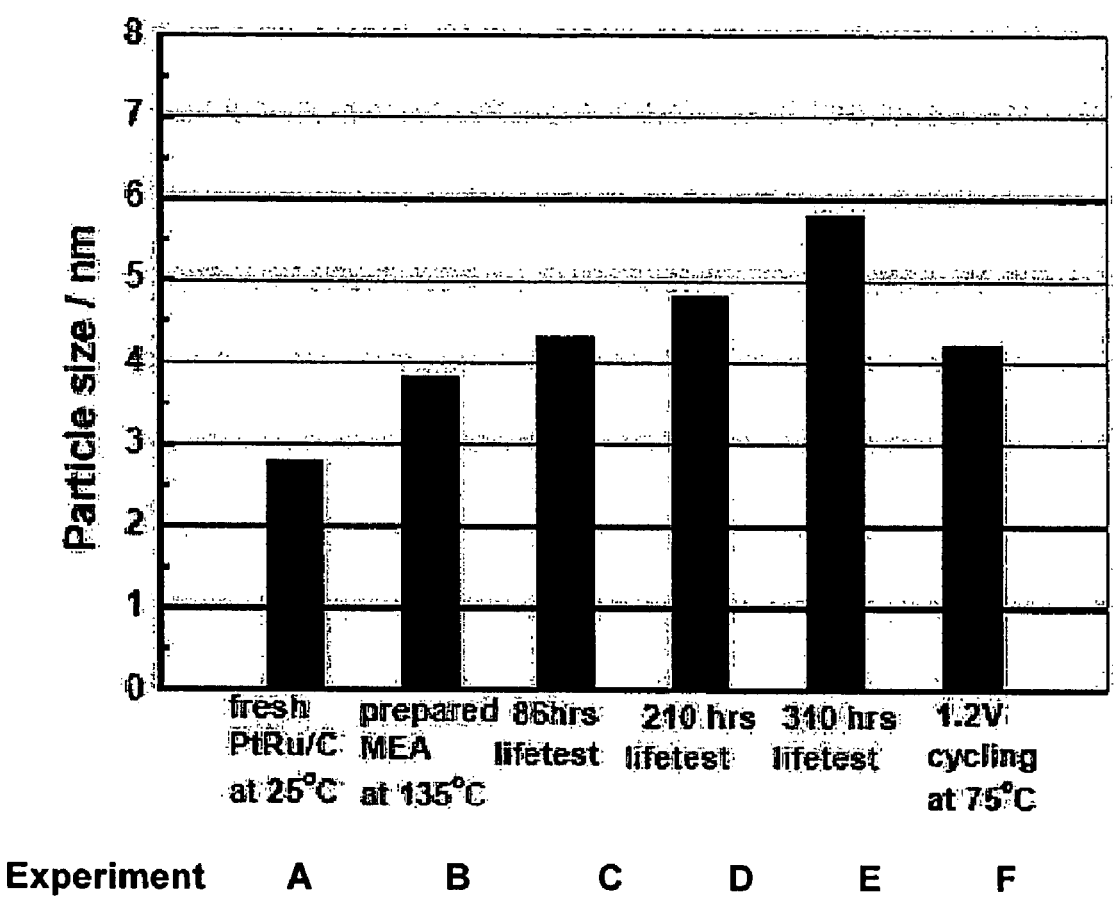
FIG. 7 is a graph showing particle sizes of catalyst (PtRu/C) particles for various experimental conditions.
Figure 1C:
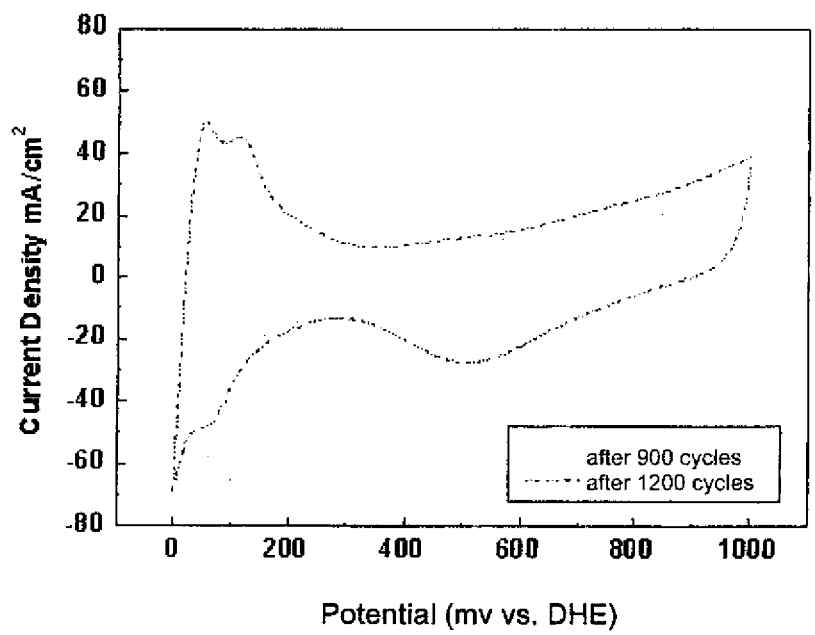
Figure 2:
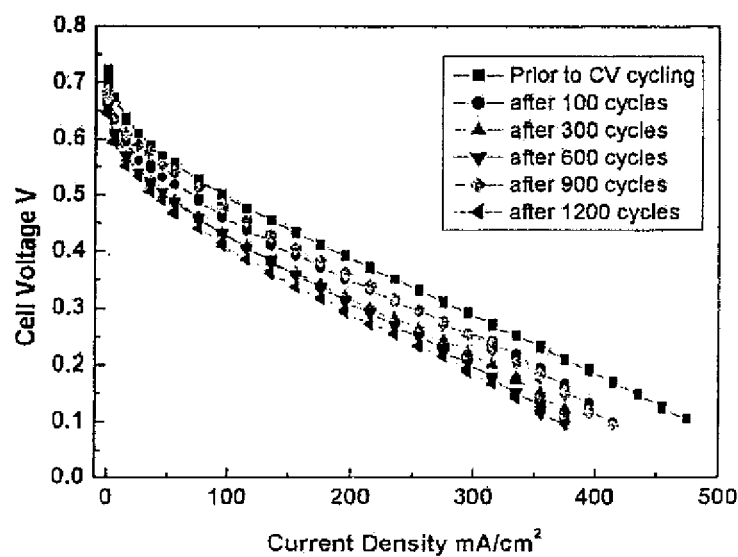

In addition, the variation in catalyst (PtRu/C) particle size with respect to different experimental conditions was investigated and the results are illustrated in FIG. 7. In Experiment A, the catalyst (45 wt % PtRu/C) particle size was measured using TEM at 25° C. In Experiment F, the catalyst particle size was measured using TEM after measuring the CV for 3 hours in a range from 0 to 1.2 V.

Referring to FIG. 7, the size of a catalyst having an initial average particle size of 2.8 nm in diameter increased to about 4.8 nm in average particle diameter after operating normally (a conventional method of measuring a voltage or a current with time) for 210 hours (D), but increased to 4.2 nm after running for several hours at 0 to 1.2 V greater than the catalyst oxidation voltage (F). At an operation voltage greater than the catalyst oxidation voltage, the catalyst aging is accelerated, even in a short time, and the catalyst particle size increases and its activity sharply reduces. Therefore, it can be seen that an accelerated experiment regarding catalyst aging was performed within a short time, obtaining the same results as when operating normally. Values shown for Experiments C and E indicate particle sizes of about 4.2 and about 5.8 for conventional life tests of 86 hours and 310 hours, respectively. As shown in FIG. 7, a catalyst particle size obtained after accelerated testing (F) for three hours is within about 20 percent of a catalyst particle size obtained after actual operation for 210 hours (D).

In Experiment B, MEA was manufactured using the catalyst (45 wt % PtRu/C), and then the resultant was heat-treated at a temperature of 135° C. In Experiments A through E, catalyst particles were prepared at a temperature of 25° C. and they were not heat-treated. The Experiment B shows a variation in catalyst particle size depending on the heat-treatment. Thus, the results for Experiment A and B indicate a variation in catalyst particle size with respect to the heat treatment temperature of the catalyst particle.

The accelerated testing method to evaluate the lifespan of a fuel cell according to aspects of the present invention can be used to evaluate the lifespan of a fuel cell within a short time at lower cost than a conventional testing method.

Although a few embodiments of the present invention have been shown and described, it would be appreciated by those skilled in the art that changes may be made in this embodiment without departing from the principles and spirit of the invention, the scope of which is defined in the claims and their equivalents.

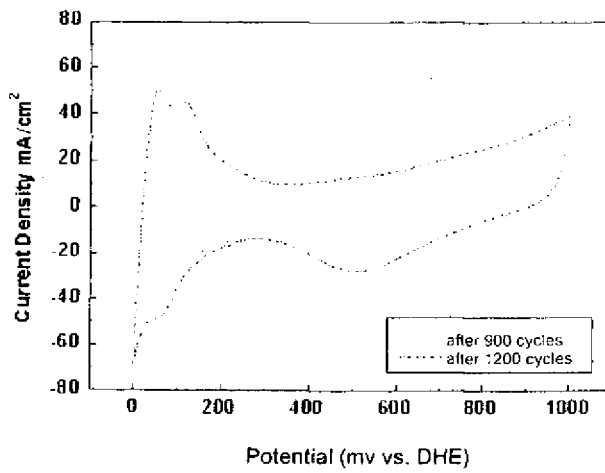

What is claimed is:

1. An accelerated testing method of evaluating a lifespan of a fuel cell including a cathode and an anode which contain respective catalysts and an electrolyte membrane interposed between the anode and the cathode, the method comprising:
   measuring a cyclic voltammetry (CV) curve of the fuel cell using CV with a scan voltage ranging from a low voltage to a voltage greater than oxidation voltages of the catalysts;
   a variation in cell performance with respect to a number of CV cycles performed, by investigating a variation in cell potential with respect to the current density of the fuel cell; and
   determining the lifespan of the fuel cell from a degree of the variation in the cell performance measured,
   wherein the lifespan of the fuel cell is defined as the number of CV cycles after which the cell potential is reduced to about 25% of the cell potential obtained after 1 CV cycle at a current density of about 200 mA/cm$^2$.

2. The accelerated testing method of claim 1, wherein the scan voltage ranges from 0.3V to 1.5 V.

3. The accelerated testing method of claim 1, wherein:
   when measuring the CV curve, a working electrode is the anode and a reference electrode/counter electrode is the cathode, or a working electrode is the cathode and the reference electrode/counter electrode is the anode.

4. The accelerated testing method of claim 1, wherein the each catalyst is at least one compound selected from the group consisting of PtRu/C, PtRu black, Pt/C, Pt black, PtSn, PtPd, PtNi, PtMo, PtOs and PtCo.

5. The accelerated testing method of claim 1, further comprising:
   determining a degree of catalyst aging by observing catalyst particles and morphologic variations.

6. The accelerated testing method of claim 5, wherein the scan voltage is in a range of 0.3 to 1.5 V.

7. The accelerated testing method of claim 1, wherein the scan voltage is in a range of 0.3 to 1.5 V.

8. A method of estimating a lifespan of a fuel cell including a cathode and an anode which contain respective catalysts and an electrolyte membrane interposed between the anode and the cathode, the method comprising:
   performing repetitive potential cycling of the anode relative to the cathode with a scanning voltage ranging from less than an oxidation voltage of the catalysts to greater than the oxidation voltages of the catalysts;

measuring a current density of the fuel cell after a first predetermined number of the potential cycles;

measuring the current density of the fuel cell after a second predetermined number of the potential cycles;

measuring a variation in cell performance with respect to a number of cyclic voltammetry (CV) cycles performed, by investigating a variation in cell potential with respect to the current density of the fuel cell; and determining the lifespan of the fuel cell from a degree of the variation in the cell performance measured, wherein the lifespan of the fuel cell is defined as the number of CV cycles after which the cell potential is reduced to about 25% of the cell potential obtained after 1 CV cycle at a current density of about 200 mA/cm$^2$.

9. The method of claim 8, wherein:

a rate of change of the scanning voltage is in a range of 20-50 mv/s.

* * * * *

UNITED STATES PATENT AND TRADEMARK OFFICE
CERTIFICATE OF CORRECTION

| | | |
|---|---|---|
| PATENT NO. | : 7,906,243 B2 | Page 1 of 3 |
| APPLICATION NO. | : 11/336873 | |
| DATED | : March 15, 2011 | |
| INVENTOR(S) | : Seung-Jae Lee et al. | |

It is certified that error appears in the above-identified patent and that said Letters Patent is hereby corrected as shown below:

Delete Title Page, and insert new Title Page.

On the Title Page

(56) References Cited
FOREIGN PATENT DOCUMENTS

Insert -- JP 10-270056 10/1998 --

(56) References Cited
OTHER PUBLICATIONS

Insert -- English machine translation of Japanese reference listed above --

(56) References Cited
OTHER PUBLICATIONS

Insert -- Japanese Office action dated October 12, 2010, for corresponding Japanese Patent application 2006-014071 --

(57) ABSTRACT, line 9

Before -- estimated --
Insert -- be --

In the Drawings

Figure 1C:
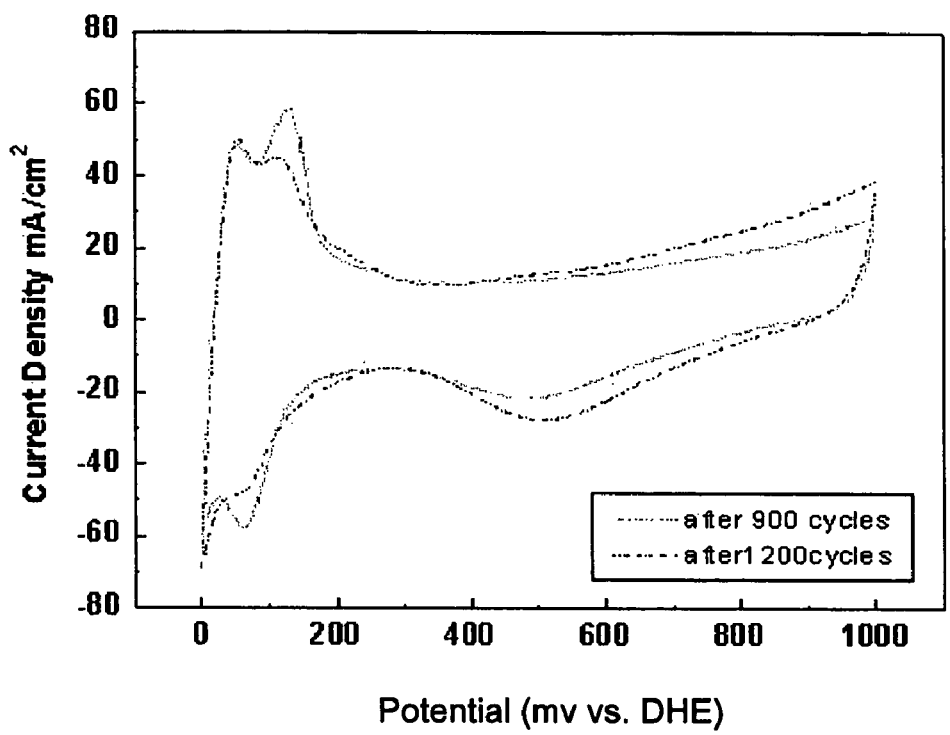
Figure 2:
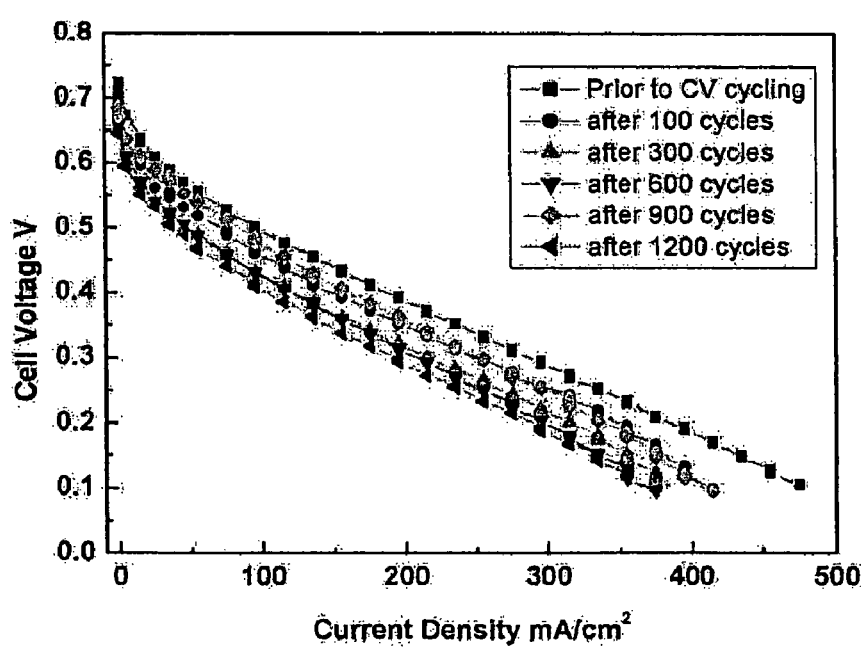
FIG. 2 is a graph of cell potential with respect to current density of the fuel cell according to Example 1 of the present invention.

FIG. 1C, Sheet 2 of 5

Delete Drawing Sheet 2 and substitute therefore the Drawing Sheet, consisting of FIG. 1C, as shown on the attached page Delete "after1 200cycles"
Insert -- after 1200 cycles --

Signed and Sealed this
Ninth Day of October, 2012

David J. Kappos
*Director of the United States Patent and Trademark Office*

(12) United States Patent
Lee et al.

(10) Patent No.: US 7,906,243 B2
(45) Date of Patent: Mar. 15, 2011

(54) ACCELERATED TESTING METHOD OF RAPIDLY EVALUATING LIFESPAN OF FUEL CELL

(75) Inventors: Seung-jae Lee, Seongnam-si (KR); Hyuk Chang, Seongnam-si (KR); Ji-rae Kim, Seoul (KR); Gongquan Sun, Dalian (CN); Xinsheng Zhao, Dalian (CN); Qin Xin, Dalian (CN)

(73) Assignee: Samsung SDI Co., Ltd., Yongin-si (KR)

( * ) Notice: Subject to any disclaimer, the term of this patent is extended or adjusted under 35 U.S.C. 154(b) by 1355 days.

(21) Appl. No.: 11/336,873

(22) Filed: Jan. 23, 2006

(65) Prior Publication Data
US 2006/0166052 A1 Jul. 27, 2006

(30) Foreign Application Priority Data
Jan. 21, 2005 (KR) .................. 10-2005-0005817

(51) Int. Cl.
*H01M 8/00* (2006.01)
(52) U.S. Cl. .................. 429/432; 429/431
(58) Field of Classification Search .............. 429/13, 429/430, 431, 432
See application file for complete search history.

(56) References Cited

U.S. PATENT DOCUMENTS

| | | | |
|---|---|---|---|
| 4,716,087 A * | 12/1987 | Ito et al. | 429/40 |
| 2003/0198852 A1* | 10/2003 | Masel et al. | 429/30 |
| 2004/0095127 A1 | 5/2004 | Mohri et al | |

FOREIGN PATENT DOCUMENTS

| | | |
|---|---|---|
| GB | 2 015 171 | 9/1979 |
| JP | 08-048502 | 2/1996 |
| JP | 09-180737 | 7/1997 |
| JP | 9-274929 | 10/1997 |
| JP | 2000-048845 | 2/2000 |
| JP | 2000-206214 | 7/2000 |
| JP | 2004-039490 | 2/2004 |
| JP | 2004039490 A * | 2/2004 |
| JP | 2004-172105 | 6/2004 |
| JP | 2004-220786 | 8/2004 |

(Continued)

OTHER PUBLICATIONS

Thomas et al., "Direct methanol fuel cells: progress in cell performance and cathode research", J. of Electrochim. Acta. 47 (2002), pp. 3741-3748.

(Continued)

*Primary Examiner* — Dah-Wei D Yuan
*Assistant Examiner* — Stephan Essex
(74) *Attorney, Agent, or Firm* — Christie, Parker & Hale, LLP

(57) ABSTRACT

A method of estimating a lifespan of a fuel cell including a cathode and an anode which contain catalysts and an electrolyte membrane interposed between the anode and the cathode. A cyclic potential with a voltage ranging from a low voltage to a voltage greater than oxidation voltages of the catalysts is applied between the anode and the cathode and fuel cell performance is measured initially and after a predetermined number of cycles. The lifespan of the fuel cell may estimated based on degradation of cell performance after the predetermined number of cycles, based on CV curves obtained during the cycling of the potential and/or a change in particle size of the catalysts after the predetermined number of cycles.

9 Claims, 5 Drawing Sheets